(12) United States Patent
Shirazi et al.

(10) Patent No.: US 10,191,079 B2
(45) Date of Patent: Jan. 29, 2019

(54) METHOD AND SYSTEM OF DUAL-MODE ACTUATION AND SENSING FOR REAL-TIME CALIBRATION OF AXISYMMETRIC RESONANT GYROSCOPES

(71) Applicant: Georgia Tech Research Corporation, Atlanta, GA (US)

(72) Inventors: Arashk Norouz Pour Shirazi, Atlanta, GA (US); Farrokh Ayazi, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 232 days.

(21) Appl. No.: 14/942,530

(22) Filed: Nov. 16, 2015

(65) Prior Publication Data

US 2016/0139176 A1   May 19, 2016

Related U.S. Application Data

(60) Provisional application No. 62/079,694, filed on Nov. 14, 2014.

(51) Int. Cl.
| | |
|---|---|
| *G01P 21/00* | (2006.01) |
| *G01P 15/097* | (2006.01) |
| *G01P 15/125* | (2006.01) |
| *G01C 19/5719* | (2012.01) |
| *G01C 19/5726* | (2012.01) |
| *G01C 19/5776* | (2012.01) |

(52) U.S. Cl.
CPC .......... *G01P 21/00* (2013.01); *G01C 19/5719* (2013.01); *G01C 19/5726* (2013.01); *G01C 19/5776* (2013.01); *G01P 15/097* (2013.01); *G01P 15/125* (2013.01)

(58) Field of Classification Search
CPC ........... G01C 19/5726; G01C 19/5776; G01P 15/097; G01P 15/125
See application file for complete search history.

(56) References Cited

U.S. PATENT DOCUMENTS

| | | | |
|---|---|---|---|
| 2003/0101814 A1* | 6/2003 | Challoner | G01C 19/5719 73/504.12 |
| 2016/0003618 A1* | 1/2016 | Boser | G01C 19/5776 73/504.12 |

\* cited by examiner

*Primary Examiner* — Paul M. West
(74) *Attorney, Agent, or Firm* — Burns & Levinson LLP; Bruce D. Jobse

(57) ABSTRACT

A dual-mode actuation and sensing circuit actuates both modes of an axisymmetric gyroscope and senses both outputs thereof. The sum of the two outputs provides a self-sustaining closed-loop oscillation signal, while the difference of the two mode outputs is used for extracting differential rate information while rejecting the common-mode bias terms of the gyroscope to provide online bias calibration. The proposed system and method facilitates scale factor calibration of an axisymmetric gyroscope. Furthermore, the difference output of the dual-mode gyroscope can provide a mode-split indicator signal which can be used to automatically match the gyroscope modes.

18 Claims, 11 Drawing Sheets

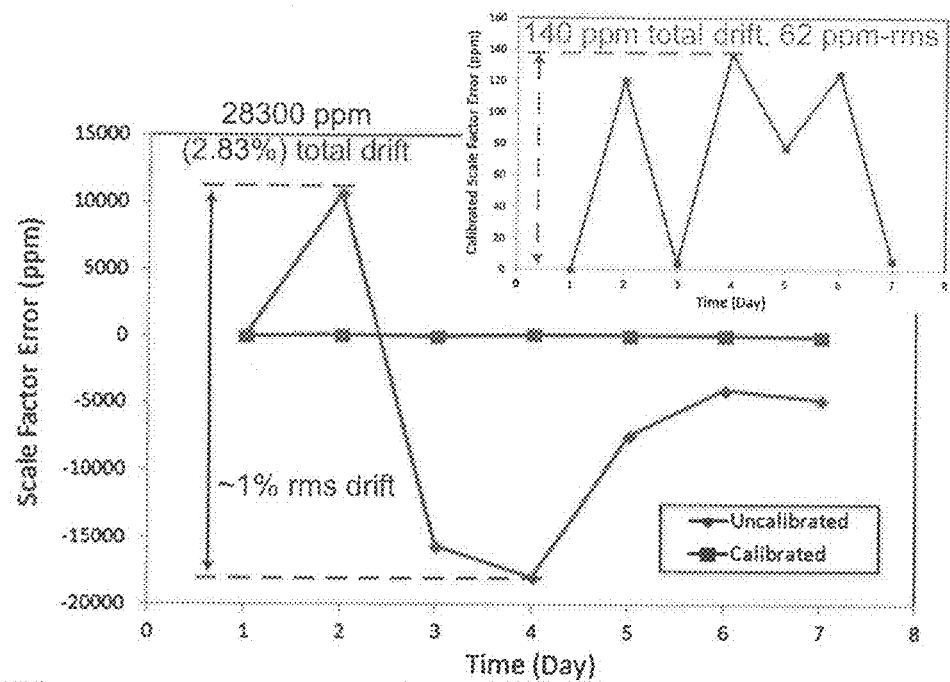
Figure 5
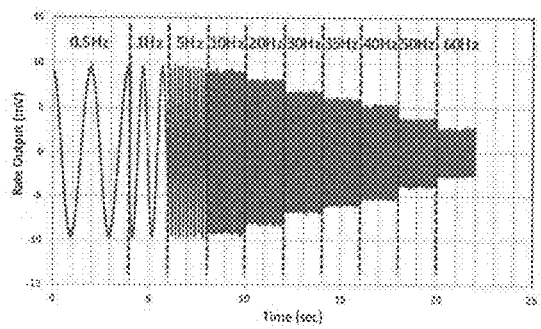
Figure 6A
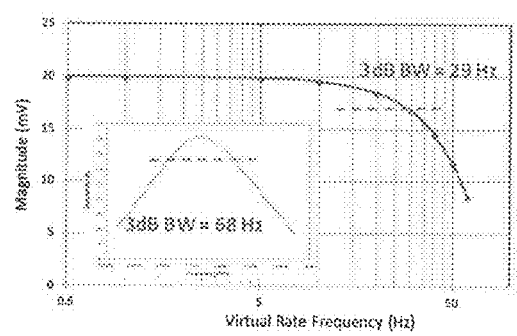
Figure 6.B

METHOD AND SYSTEM OF DUAL-MODE ACTUATION AND SENSING FOR REAL-TIME CALIBRATION OF AXISYMMETRIC RESONANT GYROSCOPES

CROSS-REFERENCE TO RELATED APPLICATIONS

This application claims priority to U.S. Provisional Patent Application Ser. No. 62/079,694 filed on Nov. 14, 2014, A Dual-Mode Actuation and Sensing Scheme for Real-time Calibration of Bias and Scale Factor in Axisymmetric Resonant Gyroscopes, the subject matter of which is incorporated herein by this reference for all purposes.

STATEMENT REGARDING FEDERALLY SPONSORED RESEARCH OR DEVELOPMENT

The subject matter disclosed herein was made partially with U.S. Government support from DARPA under contract W31P4Q-12-1-0004. The U.S. Government may have certain rights in the invention.

FIELD OF THE INVENTION

The present disclosure relates to gyroscopes, and, more specifically, to techniques for calibrating errors and drifts in the bias and scale factor of axisymmetric gyroscopes.

BACKGROUND OF THE INVENTION

MEMS gyroscopes have become an essential component in many consumer, industrial and automotive applications, owing to their small form factor and low production cost. However, their poor stability, also known as drift, has hindered their penetration into high-end tactical and navigation applications, where highly stable bias and scale factor are required over long periods of time to avoid significant positioning or heading errors. Improving the long-term stability of MEMS gyroscopes has created new challenges in the physical sensor design and fabrication, as well as the system architecture used to interface with the physical sensor. The development of effective self-calibration techniques would mark a significant step in that direction, because they would make it possible to maintain high accuracy in the sensors over time without the need for periodic off-line recalibration in specialized facilities.

Different solutions have been offered in recent years for the self-calibration problem, such as the phase-modulated (PM) gyroscope or frequency-modulated (FM) gyroscope, to provide self-calibration of scale factor to the gyroscope operation. However, most of these phase-based or frequency-based techniques fundamentally suffer from low signal-to-noise ratio caused by their relatively low sensitivity.

An efficient technique for calibration of the bias errors in axisymmetric gyroscopes used in recent years is mode-reversal. Although this technique can efficiently reduce the bias errors in an axisymmetric gyroscope, the post-processing puts a burden on its implementation. Moreover, the periodic reversal of the modes increases noise and reduces the operational bandwidth of the gyroscope. Furthermore, mode-reversal by itself cannot provide scale factor calibration capability.

Accordingly, a need exists for a system and technique in which a gyroscope, accelerometer, or other device may be self-calibrated without the need to physically rotate the device in order to determine an angular velocity of rotation for calibration purposes.

SUMMARY OF THE INVENTION

The present disclosure is directed towards systems and techniques for self-calibration of Coriolis-based vibratory gyroscopes utilizing a novel gyroscope interface architecture that actuates both modes simultaneously with identical actuation signals, and senses both outputs simultaneously to utilize the redundancy that they offer for elimination of bias errors and drifts, enhancement of sensitivity and Signal To Noise Ratio (SNR), and for providing automatic in-run scale factor calibration and in-run mode-matching capabilities. The technique can be easily implemented for axisymmetric gyroscopes, however it can theoretically also be used for asymmetric gyroscopes by accurate adjustment of gains and excitations of the two modes.

Disclosed is a dual-mode actuation and sensing system and method for axisymmetric resonant gyroscopes. The term "axisymmetric" or "axis-symmetric" is used for gyroscopes in which the two gyroscopic modes are of the same nature, thus are symmetric and behave similarly. The technique actuates both modes of the axisymmetric gyroscope with two identical in-phase excitation signals, and senses both modes for their zero-rate output (ZRO) and Coriolis signals. A difference operation on the two outputs provides bias calibration by cancelling out the identical common-mode ZRO signals of the two modes of the axisymmetric gyroscope. Moreover, the difference operation generates twice larger Coriolis output from the differential Coriolis components of each mode output. Furthermore, the difference output provides a quadrature-phase mode-split indicator that facilitates the implementation of automatic mode-matching for the gyroscope interface system. The sum of the two mode outputs can be used to provide drive oscillator loop for self-sustaining actuation of the gyroscope modes. The proposed architecture provides scale factor calibration capability by adding proper calibration stimuli to the two identical actuation signals.

According to one aspect of the disclosure, a gyroscope apparatus comprises: a resonator body; first and second drive electrodes coupled to the resonator body; first and second output electrodes coupled to the resonator body; and interface circuitry for driving the first drive electrode and second drive electrode simultaneously with a calibration signal derived at least in part from output signals from the first and second output electrodes.

According to another aspect of the disclosure, a method of calibrating a gyroscope comprises: providing a gyroscope configured for generating an output signal for each of two separate operational modes; actuating both operational modes of the gyroscope simultaneously; and generating a calibration signal derived, at least in part, from the output signal for each of two operational modes.

According to yet another aspect of the disclosure, a method of calibrating a gyroscope comprises: providing a gyroscope comprising a resonator body having a plurality of electrodes coupled thereto, the gyroscope having a plurality of operational modes; actuating both modes simultaneously with actuation signals, sensing output signs from both modes simultaneously; and detecting common components in the output signals from both modes to generate a calibrated sense signal which is free of bias.

The needs set forth herein as well as further and other needs and advantages are addressed by the present embodiments, which illustrate solutions and advantages described below. Various embodiments of the system and method are described in detail below and are also part of the present teachings.

BRIEF DESCRIPTION OF THE DRAWINGS

The present disclosure is illustratively shown and described in reference to the accompanying drawing in which:

FIG. 3 is a schematic diagram of a proposed gyroscope architecture in which analog multipliers are used to generate calibration stimuli from the x-mode and y-mode output current, according the present disclosure;

FIGS. 6A and 6B are graph illustrating that the in-run bandwidth characterization capability is provided by the scale factor self-calibration scheme. For bandwidth characterization, according the present disclosure.

DETAILED DESCRIPTION

The present disclosure will be more completely understood through the following description, which should be read in conjunction with the drawings. In this description, like numbers refer to similar elements within various embodiments of the present disclosure. Within this description, the claims will be explained with respect to embodiments. The skilled artisan will readily appreciate that the methods, apparatus and systems described herein are merely exemplary and that variations can be made without departing from the spirit and scope of the disclosure. As used herein the phrase "Equation (N)" where N is an integer value, may refer to a single or multiple mathematical expressions, as indicated throughout the description to assist the reader in understanding the mathematical basis for the operational theory of the disclosed system and method.

Dual-Mode Actuation and Sensing of Axisymmetric Resonant Gyroscopes

Figure 1:
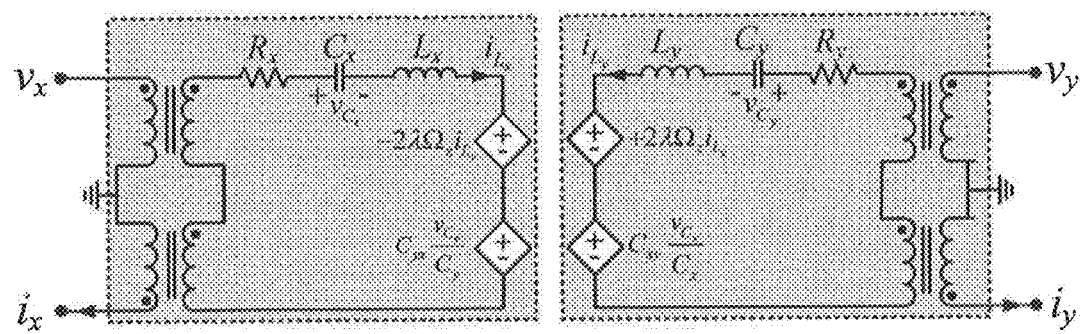
FIG. 1 illustrates conceptually an electrical model of an axisymmetric gyroscope with Coriolis and quadrature forces modeled by VCVS sources according to the present disclosure.

FIG. 1 illustrates conceptually an electrical model of an axisymmetric gyroscope with Coriolis and quadrature forces modeled by VCVS [spell out] sources according to the present disclosure. The following set of differential equations describes the response of a gyroscope to dual-mode actuation.

$$m\ddot{x}+d_{xx}\dot{x}+k_{xx}x+k_{yx}y+d_{yx}\dot{y}=f_x(t)-2m\lambda\Omega_z\dot{y}$$
$$m\ddot{y}+d_{yy}\dot{y}+k_{yy}y+k_{xy}x+d_{xy}\dot{x}=f_y(t)+2m\lambda\Omega_z\dot{x} \quad (1)$$

The displacement and velocity of each resonance mode with $\omega_0=\sqrt{k_{ii}/m}$, and $Q=m\omega_0/d_{ii}$ can be calculated based on the above equation, for given values of rotation of, angular gain $\lambda$, and mode coupling coefficients $k_{xy}$, $k_{yx}$, $d_{xy}$, and $d_{yx}$. FIG. 1 shows a circuit model of the above set of equations.

In conventional single-mode AM gyroscope scheme, $f_x(t)=f_{drv}\cos\omega_0 t$, while $f_y(t)=0$. Assuming that the x-mode is actuated by a self-sustaining oscillator at its resonance frequency, the phasor-domain response of the y-mode to mechanical rotation can be derived as follows:

$$Y(j\omega_0) = \frac{Q_x F_0}{m\omega_0^2} \frac{2\lambda\Omega_z + \frac{\omega_{xy}}{Q_{xy}} - j\frac{\omega_{xy}^2}{\omega_0}}{2\Delta\omega + j\frac{\omega_y}{Q_y}} \quad (2)$$

Assuming for simplicity, that the bias terms in the denominator are much smaller than the bandwidth of the gyroscope modes, the time-domain output can be rewritten as $$x(t) = \frac{Q_x F_0}{m\omega_0^2}\sin\omega_0 t, \quad (3)$$

$$y(t) = \frac{Q_x F_0}{m\omega_0^2} \frac{\left(2\lambda\Omega_z + \frac{\omega_{xy}}{Q_{xy}}\right)\cos(\omega_0 t + \varphi) + \frac{\omega_{xy}^2}{\omega_0}\sin(\omega_0 t + \varphi)}{\sqrt{(2\Delta\omega)^2 + (\omega_0/Q_s)^2}},$$

$$\varphi = \tan^{-1}\frac{f_0/Q_s}{\Delta f}.$$

Therefore, the y-mode response of the gyroscope has not only Coriolis contents, but also contains in-phase and quadrature-phase ZRO components that are sensed and demodulated by the x-mode actuation force as the carrier signal. The presence of these parasitic terms is the main mechanism of bias drift and noise performance degradation in MEMS vibratory gyroscopes. Various mechanical and electrical techniques have been utilized in the literature to eliminate the effect of the undesired ZRO in the sense-mode output.

An important challenge in the interface of resonant gyroscopes is the implementation of an efficient automatic mode-matching scheme that can sense the split of the gyroscope modes at all times, even during the gyroscope operation. However, as can be seen in Equation (3), the y-mode response does not provide a good indicator of the split between the modes of the gyroscope, making this a challenging problem for the interface of resonant gyroscopes.

Figure 2:
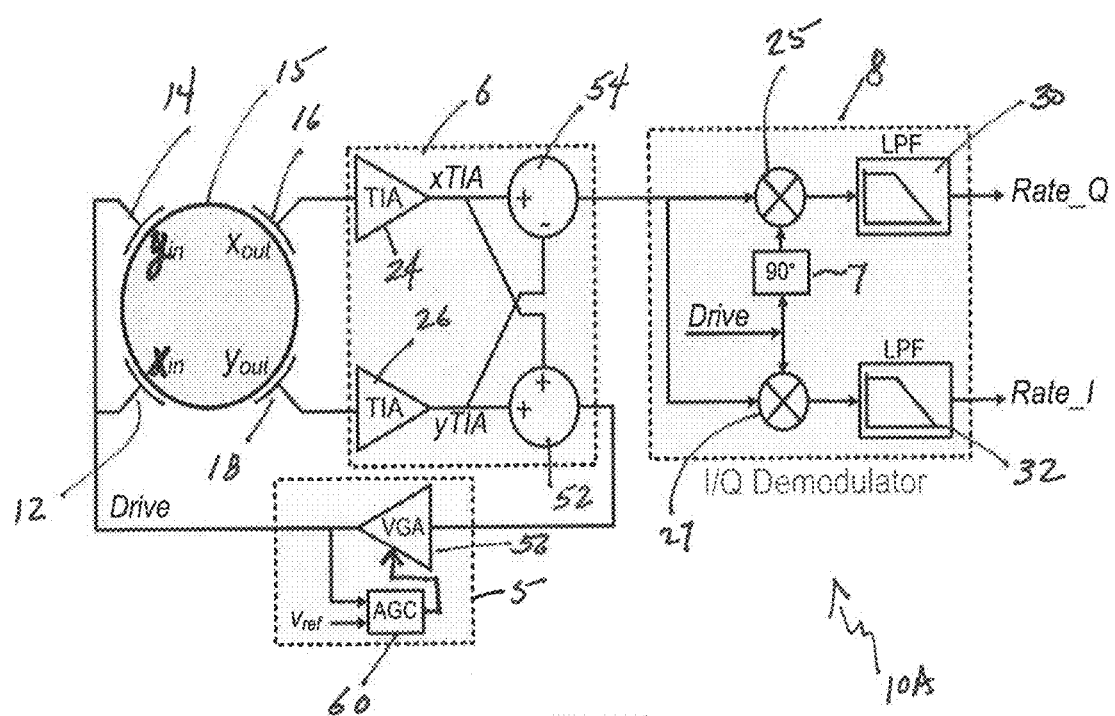
FIG. 2 is a schematic diagram of a proposed gyroscope architecture in which a summation output is used to close the drive loop, while the difference output is demodulated for pure rate output according to the present disclosure.

The architecture of FIG. 2 enables actuating both modes simultaneously with identical excitation signals, and also sensing both modes at the same time. The difference of the two sense outputs is generated in analog domain and in real-time, to provide pure Coriolis signal from the differential Coriolis terms of the two outputs, and to eliminate the effect of the common-mode bias terms, given that the cross-coupling terms of the two modes are equal, i.e. $k_{xy}=k_{yx}$ and $d_{xy}=d_{yx}$. The sum of the two gyroscope outputs is used to close an oscillator loop for self-sustaining actuation of the device. It can be shown with simulation and also in theory that in case of frequency mismatch between the modes of the gyroscope, the closed-loop oscillation locks into the average of the two frequencies, i.e., $f_0=(f_x+f_y)/2$. Moreover, the summation output does not contain significant Coriolis contents, which makes the oscillation frequency sufficiently independent of the applied rotation rate.

In the disclosed system, the simplified set of equations for the gyroscope without ZRO can be written as $$m\ddot{x}+d_{xx}\dot{x}+k_{xx}x=f_{drv}\cos(t)-2m\lambda\Omega_z\dot{y}$$

$$m\ddot{y}+d_{yy}\dot{y}+k_{yy}y=f_{drv}\cos(t)+2m\lambda\Omega_z\dot{x} \quad (4)$$

In a resonant axisymmetric gyroscope with a frequency split $\Delta\omega$ between the modes, and quality factor Q, the above set of equations can be solved in phasor domain to derive the sum and difference of the x-mode and y-mode displacements as follows $$X_{Sum}(j\omega_0) = \quad (5)$$

$$X(j\omega_0)+Y(j\omega_0) = -\frac{2F_0}{m\omega_0^2}\frac{\left(\frac{\Delta\omega}{2}\right)^2+j\frac{\omega_0^2}{Q}}{(\Delta\omega)^2+\left(\frac{\omega_0}{Q}\right)^2+4\lambda^2\Omega_z^2-j\frac{(\Delta\omega)^2}{2Q}}$$

$$X_{Diff}(j\omega_0) = Y(j\omega_0)+X(j\omega_0) =$$

$$-\frac{F_0}{m\omega_0^2}\frac{2\omega_0\Delta\omega+\frac{\omega_0\Delta\omega}{Q}+j4\lambda\omega_0\Omega_z}{(\Delta\omega)^2+\left(\frac{\omega_0}{Q}\right)^2+4\lambda^2\Omega_z^2-j\frac{(\Delta\omega)^2}{2Q}}$$

Assuming that $\Delta\omega\ll\omega_0$, (5) can be simplified to generate the sum and difference displacements as follows $$X_{Sum}(j\omega_0) \approx \frac{2F_0}{m\omega_0}\frac{j\frac{\omega_0}{Q}}{(\Delta\omega)^2+\left(\frac{\omega_0}{Q}\right)^2+(2\lambda\Omega_z)^2} \quad (6)$$

$$X_{Diff}(j\omega_0) \approx \frac{2F_0}{m\omega_0}\frac{\Delta\omega+j2\lambda\Omega_z}{(\Delta\omega)^2+\left(\frac{\omega_0}{Q}\right)^2+(2\lambda\Omega_z)^2}$$

As can be seen, the dual-mode actuation scheme can provide at least twice larger sensitivity than that of the conventional single-mode AM gyroscope scheme in both mode-split and mode-matched conditions.

The in-phase component of the difference output current is a direct measure of rate only, while its quadrature-phase component is directly proportional to the mode split, $\Delta\omega$. The mode-split information can facilitate the effective implementation of automatic mode-matching for the gyroscope system. This offers a significant advantage over the conventional coherent demodulation scheme, where complicated architectures were needed to monitor the amplitude or phase of the sense-mode output, for an implication of mode split, without being misled by the added Coriolis component to the sense signal.

Self-Calibration of Bias Terms

With the proposed scheme, and in presence of ZRO terms, (1) can be written as $$m\ddot{x}+d_{xx}\dot{x}+k_{xx}x+k_{yx}y+d_{xy}\dot{y}=f_{drv}\cos(\omega_0 t)-2m\Omega_z\dot{y},$$

$$m\ddot{y}+d_{yy}\dot{y}+k_{yy}y+k_{xy}x+d_{xy}\dot{x}=f_{drv}\cos(\omega_0 t)+2m\lambda\Omega_z\dot{x} \quad (8)$$

Given that for the gyroscope system $$\frac{k_{xy}}{m}=\frac{k_{yx}}{m}=\omega_{xy}^2=\omega_{yx}^2 \quad (9)$$

$$\frac{d_{xy}}{m}=\frac{d_{yx}}{m}=\frac{\omega_{xy}}{Q_{xy}}=\frac{\omega_{yx}}{Q_{yx}},$$

and the fact that for the axisymmetric gyroscope, the output currents resulting from $d_{ij}$ and $k_{ij}$ terms are also equal, Equation (8) can be solved to derive the displacement summation and difference as follows $$X_{Sum}(j\omega_0) = \frac{-\left(\frac{2F_0}{m\omega_0^2}\right)\left[\left(\frac{\Delta\omega}{2}\right)^2+j\frac{\omega_0^2}{Q}-\omega_{xy}^2-j\omega_0\frac{\omega_{xy}}{Q_{xy}}\right]}{\left((\Delta\omega)^2+\left(\frac{\omega_0}{Q}\right)^2+4\lambda^2\Omega_z^2\right)-\left(\frac{\omega_{xy}^4}{\omega_0^2}-\frac{\omega_{xy}^2}{Q_{xy}^2}\right)-j\left(\frac{(\Delta\omega)^2}{2Q}+\frac{2\omega_{xy}^2}{\omega_0}\frac{\omega_{xy}}{Q_{xy}}\right)} \quad (10)$$

$$X_{Diff}(j\omega_0) = \frac{-\left(\frac{F_0}{m\omega_0^2}\right)\left[2\omega_0\Delta\omega+\frac{\omega_0\Delta\omega}{Q}+j4\lambda\omega_0\Omega_z\right]}{\left((\Delta\omega)^2+\left(\frac{\omega_0}{Q}\right)^2+4\lambda^2\Omega_z^2\right)-\left(\frac{\omega_{xy}^4}{\omega_0^2}-\frac{\omega_{xy}^2}{Q_{xy}^2}\right)-j\left(\frac{(\Delta\omega)^2}{2Q}+\frac{2\omega_{xy}^2}{\omega_0}\frac{\omega_{xy}}{Q_{xy}}\right)}$$

As can be seen from (10), the difference output has all the bias terms cancelled out in the numerator, however the bias terms still modify the transfer function of the system as they show up in the denominator of both the sum and difference outputs. Therefore, in order to reduce their undesired effect on the system transfer function, it is still preferred that the value of these mode coupling terms be reduced by proper mechanical design.

FIG. 2 illustrates a conceptual circuit 10A used in conjunction with a gyroscope 15 in accordance with the disclosure. Gyroscope 15 comprises a resonator body 21 having drive electrodes 12 and 14 and corresponding sense electrodes 16 and 18, respectively, coupled thereto. It is generally understood that the drive and sense electrodes can be coupled to the resonator body through a number of transduction mechanisms such as capacitive, piezoelectric, piezoresistive, electromagnetic, optical and or thermal. A gyroscope 15 suitable for use with the disclosed system is described in commonly assigned U.S. Pat. No. 7,543,496. It will be obvious to those reasonably skilled in the arts that other gyroscope designs, including ring, hemispherical shell and mode-matched tuning-fork gyroscopes, may likewise be utilized with the calibration architecture and techniques disclosed herein.

Circuit 10A comprises a mode excitation section 5, a trans-impedance amplification section 6, and an I/Q demodulation section 8, as illustrated. In mode excitation section 5, automatic gain control 60 receives a Vref signal, e.g. a DC reference voltage, as well as the Drive signal output from VGA 56 and provides its output signal back to VGA 56. The output of VGA 56 is the Drive signal which is provided unprocessed to drive electrode 12 and 14 of gyroscope 15 as well as to phase shifter 7 and multiplier 27 of demodulator section 8. In the mode-matching system of the disclosed embodiment, the VGA gain can be also controlled by the amplitude of the VGA input, which is the sum output.

The trans-impedance amplification section 6, serves as an analog front end to demodulation section 8 and comprises a pair of trans-impedance amplifiers 24 and 26 and a summing element 52 and a differential element 54. The output of sense electrode 16 of gyroscope 15 is provided to amplifier 24 while the output of the sense electrode 18 is provided to amplifier 26, as illustrated. The outputs of amplifiers 24 and 26 are provided to summing element 52, the output of which represents a summation signal which is provided back to VGA 56 of section 5 and function as a component of the Drive signal. The outputs of amplifiers 24 and 26 are also provided to differential element 54, the output of which represents a difference signal and which is provided back to demodulator section 8. The output of the amplifier 24 is also provided to amplifier 40 of section 20. The output of the amplifier 26 is also provided to amplifier 46 of section 20, as illustrated.

Demodulation section 8, comprises two processing signal paths. In the first signal path, a multiplier 25 receives the output of differential element 54 and multiplies it with a version of the Drive signal which has been shifted by 90° by phase shifter 7. The product signal output from multiplier 25 is then provided to a Low Pass Filter (LPF) 30, the output of which represents the signal Rate_Q. In the second signal path, a multiplier 27 receives the output of differential element 54 and multiplies it with the Drive signal. The product signal output from multiplier 27 is then provided to a Low Pass Filter (LPF) 32, the output of which represents the signal Rate_I.

The disclosed architecture, as shown in FIG. 2, was implemented to interface with a 2.625 MHz bulk acoustic wave (BAW) gyroscope with a Q of 37,000 on both modes. The results are compared to those taken from conventional coherent demodulation scheme using the same gyroscope. The proposed architecture exhibits a sensitivity of 442 pA/°/s, which is twice larger than 218 pAP/°/s with coherent demodulation. Moreover, the dual-mode actuation scheme improves the bias drift of the gyroscope from 25.6°/hr in coherent demodulation to as low as 5.4°/hr, while the ARW is consistently reduced by 1.4 times, down to 0.7°/√hr, due to twice higher SNR offered by the dual-mode actuation scheme.

Scale Factor Calibration Architecture

In the proposed system and method, the Coriolis force couples the velocity of each mode to the other mode with opposite phase, and does not affect the summation output used for closing the oscillator loop. Therefore, if the velocity outputs of the two modes are cross-coupled with opposite phase, the effect of the Coriolis force can be mimicked.

FIG. 3 shows an implementation of this scale factor calibration system adapted to the proposed interface architecture. As can be seen, the x-mode output current, proportional to its velocity is scaled by $-R_F$, multiplied by $V_{cal}$ and applied to the y-mode input, while the y-mode output current is scaled by $+R_F$, multiplied by the same $V_{cal}$ and applied to the x-mode input to mimic the Coriolis effect.

The gyroscope set of equations in (4) can therefore be rewritten as follows $$m\ddot{x}+d_{xx}\dot{x}+k_{xx}x+k_{yx}y+d_{yx}\dot{y}=f_{drv}\cos(\omega_0 t)-2m\lambda\Omega_z\dot{y}-R_F A_{Cal}\eta^2\dot{y}$$

$$m\ddot{y}+d_{yy}\dot{y}+k_{yy}y+k_{xy}x+d_{xy}\dot{x}=f_{drv}\cos(\omega_0 t)+2m\lambda\Omega_z\dot{x}+R_F A_{Cal}\eta^2\dot{x}, \quad (1)$$

which can be solved to provide the response of the gyroscope system to both mechanical rate and electrical calibration rate, $V_{Cal}$ as follows $$X_{Sum}(j\omega_0) \approx \frac{-\frac{2F_0}{m\omega_0} \times \left(j\frac{\omega_0}{Q}\right)}{(\Delta\omega)^2+\left(\frac{\omega_0}{Q}\right)^2+\left(2\lambda\Omega_z+\frac{R_F\eta^2 V_{cal}}{m}\right)^2} \quad (12)$$

$$X_{Diff}(j\omega_0) \approx \frac{-\frac{2F_0}{m\omega_0}\left[\Delta\omega+j\left(\lambda\Omega_z+\frac{R_F\eta^2 V_{cal}}{m}\right)\right]}{(\Delta\omega)^2+\left(\frac{\omega_0}{Q}\right)^2+\left(2\lambda\Omega_z+\frac{R_F\eta^2 V_{cal}}{m}\right)^2}$$

As can be seen from Equation (12), the transfer function of the gyroscope system is identical for both mechanical rate $\Omega z$, and electrical calibration rate $V_{Cal}$. Therefore, the gyroscope response to $V_{Cal}$ can be used to not only find the sensitivity of the gyroscope system to mechanical rotation, but also to keep track of the variations of the scale factor. In Equation 12, $\eta$ is the transduction coefficient of the device, defining the translation of actuation voltage to actuation force, and translation of vibration displacement to output sense current. This parameter is defined differently for different transduction mechanisms such as capacitive, piezoelectric, etc.

More importantly, based on Equation (12) the architecture of FIG. 3 can be used to provide an online background calibration to the scale factor. Provided that the magnitude of the calibration force is small enough to avoid any significant changes of the overall transfer function, the virtual calibration rotation $R_F\eta^2 V_{Cal}/m$ can be applied to the system during normal rate detection operation of the gyroscope system. The variations of the calibration scale factor are monitored to provide a correction coefficient for background calibration of the mechanical rate. A significant advantage of such in-run calibration capability over offline calibrations is the elimination of time-variant errors in scale factor that can change from the calibration phase to the operation phase, or from one phase of operation to another.

FIGS. 6A and 6B are graph illustrating that the in-run bandwidth characterization capability is provided by the scale factor self-calibration scheme. For bandwidth characterization, the calibration stimulus frequency is swept from 0.5 Hz to 60 Hz to find the 3 dB loss point. The discrepancy between the measured bandwidth and actual bandwidth is caused by the additional low-pass filtering at the circuits backend.

FIG. 3 illustrates a conceptual implementation of the disclosed scale factor calibration system. More specifically, FIG. 3 illustrates a circuit 10B used in conjunction with a gyroscope 15 in accordance with embodiments of the disclosure. Circuit 10B is substantially similar to circuit 10A with the addition of a calibration circuit 20. Calibration circuit 20 comprises a pair of signal paths. In the first signal path, the output of the signal from amplifier 24, is provided to amplifier 40 which acts as a unity gain inverting amplifier. The output of amplifier 40 is then provided to multiplier 42 which multiplies the output of amplifier 40 with a calibration voltage Vcal, the source of which may be a function generator or a calibration reference generator. Vcal signal 58 may be used to mimic physical rotation in gyroscope 15, and be implemented with a low frequency signal of any kind, i.e. DC, sinusoidal, square-wave, etc. The output of multiplier 42 is provided to summing element 44 which adds the output of multiplier 42 with the Drive signal generated by mode excitation section 5 and provides an actuation signal to drive electrode 12 of gyroscope 15. In the second signal path, the output signal from amplifier 26, is provided to amplifier 46, which axis as a unity gain non-inverting amplifier. The output of amplifier 46 is then provided to multiplier 48 which multiplies the output of amplifier 46 with calibration voltage Vcal. The output of multiplier 48 is provided to summing element 50 which adds the output of multiplier 48 with the Drive signal generated by mode excitation section 5 and provides the actuation signal to drive electrode 14 of gyroscope 15.

Comparison

The disclosed system is compared to a conventional coherent demodulation architecture, mode-reversal AM gyroscope, mostly on calibration capability, automatic mode-matching capability, sensitivity and bias performance, to fully understand the advantages of the new system and method.

Conventional Coherent Demodulation

The disclosed system can be considered a coherent demodulation architecture, where instead of one mode only, both modes are actuated and sensed and provides more redundant information about the rate performance and bias errors that can be used for calibrating themselves.

As the main advantage, the proposed system and method not only provides bias calibration to the axisymmetric gyroscope, but it also facilitates scale factor calibration, which was not accurately feasible on conventional single-mode AM gyroscope architecture.

Another requirement for accurate self-calibration of resonant gyroscopes is the existence of an efficient mechanism for in-run automatic mode-matching. The offline automatic mode-matching algorithms in the past mostly relied on monitoring the magnitude of the ZRO signal as an indicator of mode split. However, when in operation, they could not keep track of the mode split variations, due to the addition of the Coriolis signal to the ZRO. Consequently, a more complicated architecture had to be used to overcome that issue by sampling the sense-mode signal at a rate higher than the input mechanical rate frequency and lower than the gyroscope resonance frequency. However, that system can still be misled by any environmentally-induced variation in the ZRO component, due to the lack of an iterative algorithm. In order to provide better monitoring of the mode split, an external in-phase excitation to the sense-mode input has been used, and the phase difference between the drive-mode and sense-mode outputs was used to monitor mode-matched condition. Despite its efficiency, that technique suffered from the effect of residual quadrature in the sense-mode output that changes the phase with respect to that of the drive-mode, and misleads the mode-matching loop. Moreover, the in-phase excitation adds a systematic ZRO to the gyroscope which can further degrade the bias and noise performance of the gyroscope system.

A significant advantage of the dual-mode architecture over the conventional AM gyroscope is the ease of real-time automatic mode-matching, by monitoring a proportional measure of the mode-split on the quadrature-phase component of the difference output as described by (6). An automatic mode-matching system can be implemented by forcing the quadrature-phase component of the difference signal to zero by using a simple PID controller, without the need for any iterative algorithm, and without the need for any additional signal injection to the gyroscope.

In terms of sensitivity and linearity, it can be understood from (3) and (6) that the dual-mode gyroscope system achieves twice larger rotation rate sensitivity than the conventional single-mode AM gyroscope. This can also be intuitively understood by the fact that the difference output in the dual-mode gyroscope contains twice larger Coriolis component. Moreover in conventional AM architecture, in split-mode condition, in order to demodulate the maximum y-mode output, the carrier frequency signal generated from the x-mode output, must track the phase changes due to $\Delta\omega$, whereas in dual-mode gyroscope the Coriolis component of the difference output is theoretically always in-phase with the drive signal, which simplifies the demodulator architecture further.

Mode-Reversal in Coherent Demodulation Gyroscope

Mode-reversal is based on switching the role of the two gyroscope modes in consecutive phases, and using the redundant bias and rate information from the two phases to cancel the effect of bias in the output, and also extract a more accurate rate response. Despite its efficiency in reducing the bias levels, the switching operation needs to happen at a frequency low enough to allow for settling of each mode for accurate recording. For instance, for 10 ppm accuracy in the recorded rate and bias data, a settling time of 11.5 $\tau$ is required which is equal to a switching frequency of ~40 msec for a gyroscope with quality factor of 20,000 and resonance frequency of 2 MHz. a 40 msec switching period can cause limitations in recovering rate information applied at frequencies close to or above 25 Hz. This can become even worse for lower frequency gyroscopes.

Moreover, the recording and post-processing not only complicate the system architecture, but it can also induce new errors due to the variation of the overall gyroscope performance from one phase to another, depending on how long of switching period is used. Furthermore, the errors associated with down conversion of the drive-loop phase noise by the bias component of the sense signal in each mode will still exist, as the noise components in each phase are uncorrelated and therefore cannot be cancelled together. In addition to making the overall output noisier, mode reversal also limits the operation bandwidth of the gyroscope system.

In mode-reversal, mode-matching can be done by comparison of the closed-loop drive oscillator frequency in both phases, which again necessitates the existence of a post processing DSP unit.

All the above issues with mode-reversal have been overcome by the proposed dual-mode gyroscope system and method, with the feasibility of simultaneous analog processing of both mode outputs. More importantly, mode-reversal did not provide scale factor calibration capability, while the dual-mode architecture allows electrical stimuli to mimic mechanical rate accurately.

Measurement Results

An axisymmetric bulk acoustic wave gyroscope with a resonance frequency of 2.625 MHz, Q=37,000, and $R_m$=32.67 k$\Omega$, is interfaced with the dual-mode gyroscope architecture of FIG. 2. The differential output current of each gyroscope mode is sensed and amplified by four transimpedance amplifiers (TIAs) with 100-kΩ transimpedance gain while the summation and difference amplifiers have a gain of unity.

Figure 7:
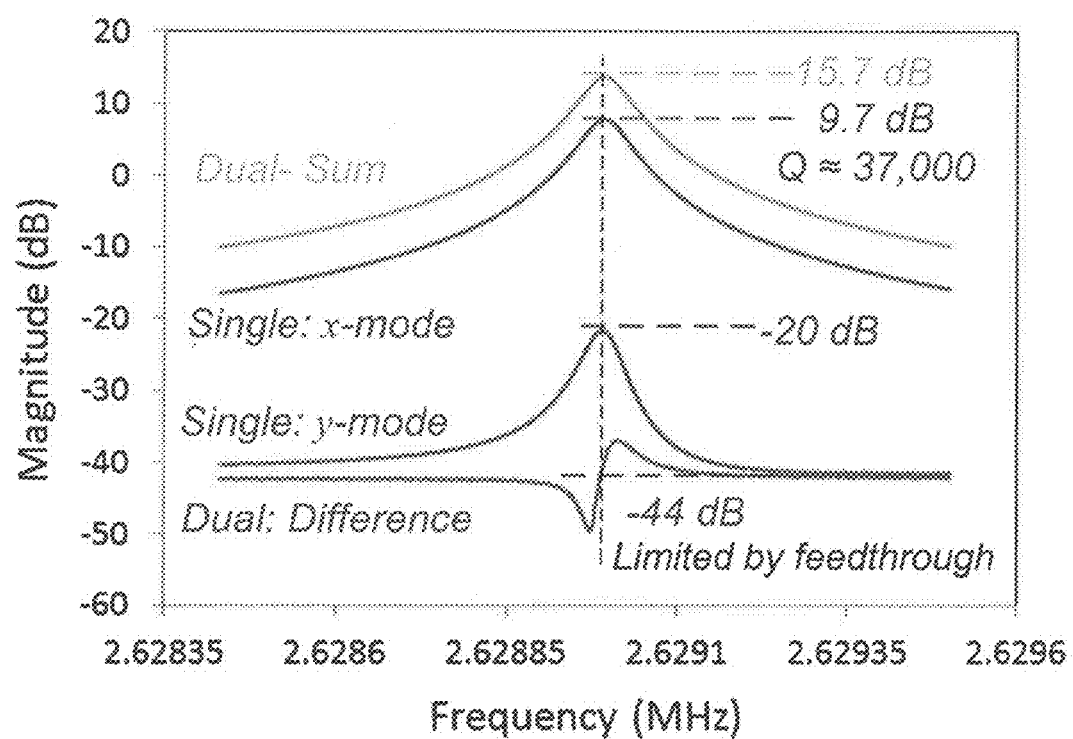
FIG. 7 is a graph illustrating the Open-loop measured response of x-mode and y-mode in conventional AM gyroscope, and sum and difference responses in dual-mode gyroscope architecture, showing 24 dB reduction in ZRO level according to the present disclosure.

FIG. 7 shows the open-loop response of the gyroscope x- and y-modes in conventional AM architecture and the response of summation and difference in dual-mode architecture. The x-mode shows an insertion loss of −9.72 dB at resonance frequency. As expected, the summation output shows 6 dB lower insertion loss than the x-mode output. Moreover, the difference output level at resonance frequency is reduced by almost 24 dB, which must be able to provide almost 10 times better drift performance in dual-mode architecture, than in conventional AM architecture.

Figure 8:
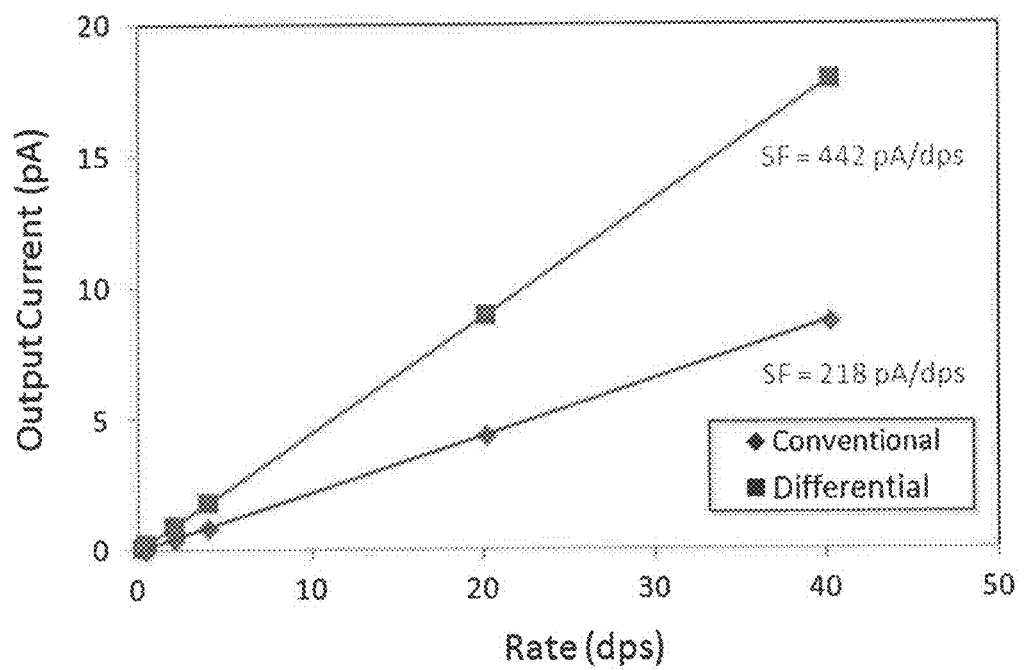
FIG. 8 is a graph illustrating the measurement results show twice larger sensitivity for the dual-mode gyroscope architecture according to the present disclosure.

FIG. 8 shows the sensitivity plots for both conventional AM and dual-mode gyroscope systems. The dual-mode architecture exhibits a sensitivity of 442 pA/°/s, which is twice larger than the scale factor of the conventional coherent demodulation gyroscope.

Figure 9:
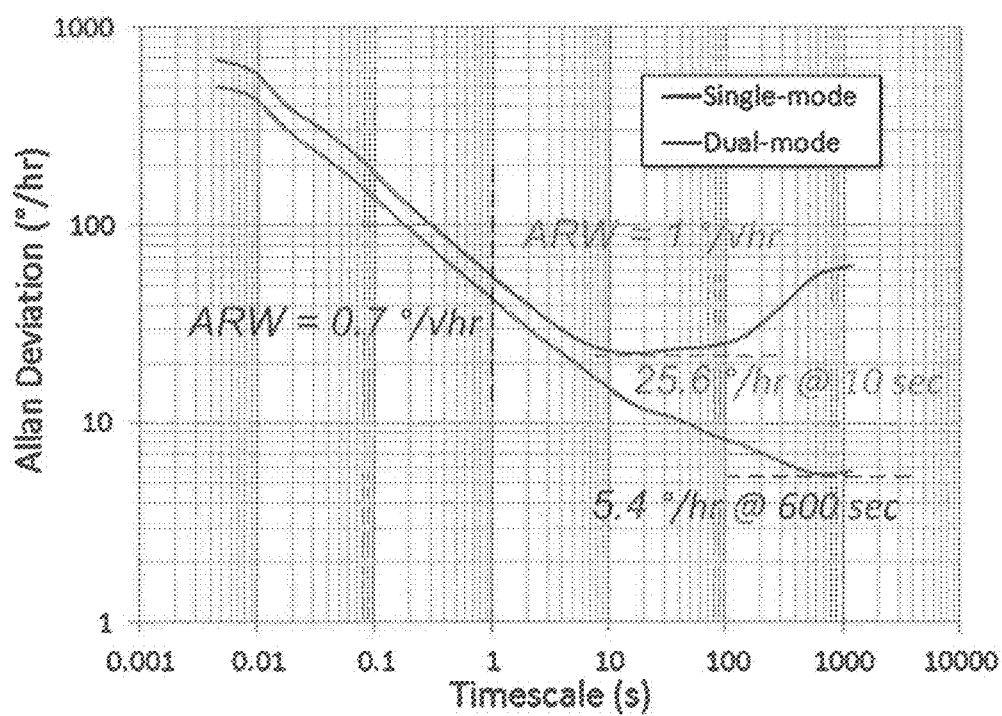
FIG. 9 is a graph illustrating the Allan variance measured for both AM gyroscope and dual-mode gyroscope, showing 5-times better bias drift, and 1.4 times lower ARW for the dual-mode architecture according to the present disclosure.

In another measurement, the long-term drift performance of both architectures was compared to verify the effect of bias calibration. Multiple measurements were taken for 1-2 hours from both gyroscope architectures, and Allan deviation was calculated for each measurement. FIG. 9 shows the Allan variance plots for a number of measurements. As can be seen, the dual-mode actuation scheme improves the bias drift of the BAW gyroscope from 25.6°/hr at 10 sec averaging time in conventional scheme to as low as 5.4°/hr at 600 sec averaging time.

The Allan variance plots in FIG. 9 also show that the angle random walk (ARW) consistently reduces by 1.4 times, from 1°/√hr in conventional single-mode AM gyroscope down to 0.7°/√hr the dual-mode architecture.

Figure 4:
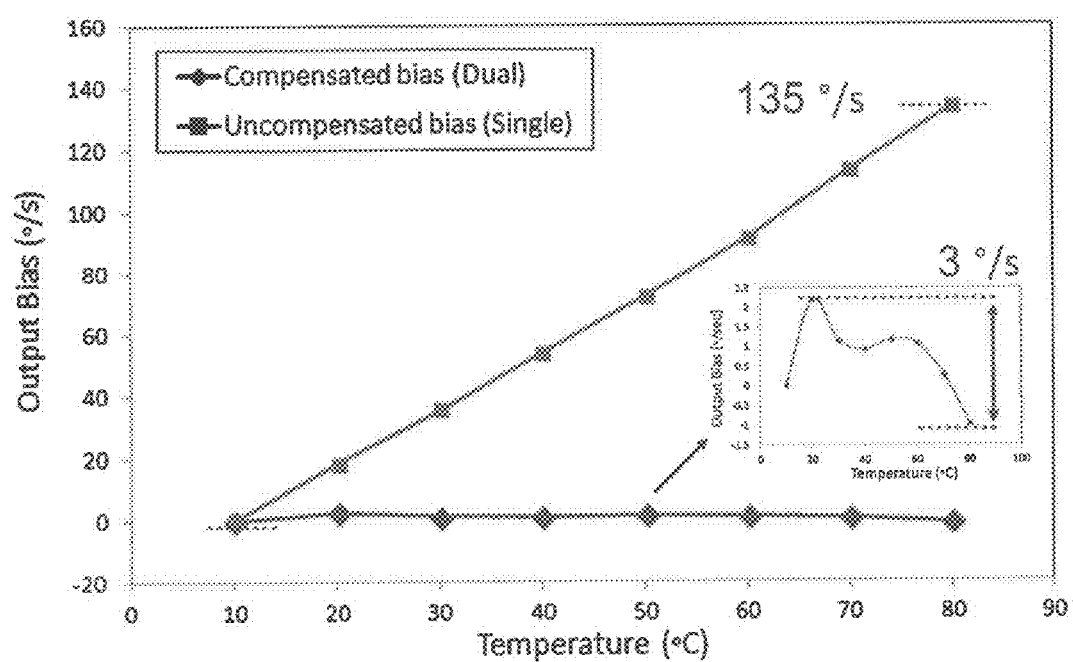
FIG. 4 is a graph illustrating that the dual-mode bias cancellation together with in-run mode-matching reduce the bias drift of the gyroscope by up to 45 times, down to 3°/s drift over a temperature range of 10-80° C., according the present disclosure.

FIG. 4 illustrates that the dual-mode bias cancellation together with in-run mode-matching reduce the bias drift of the gyroscope by up to 45 times, down to 3°/s drift over a temperature range of 10-80° C.

Figure 10:
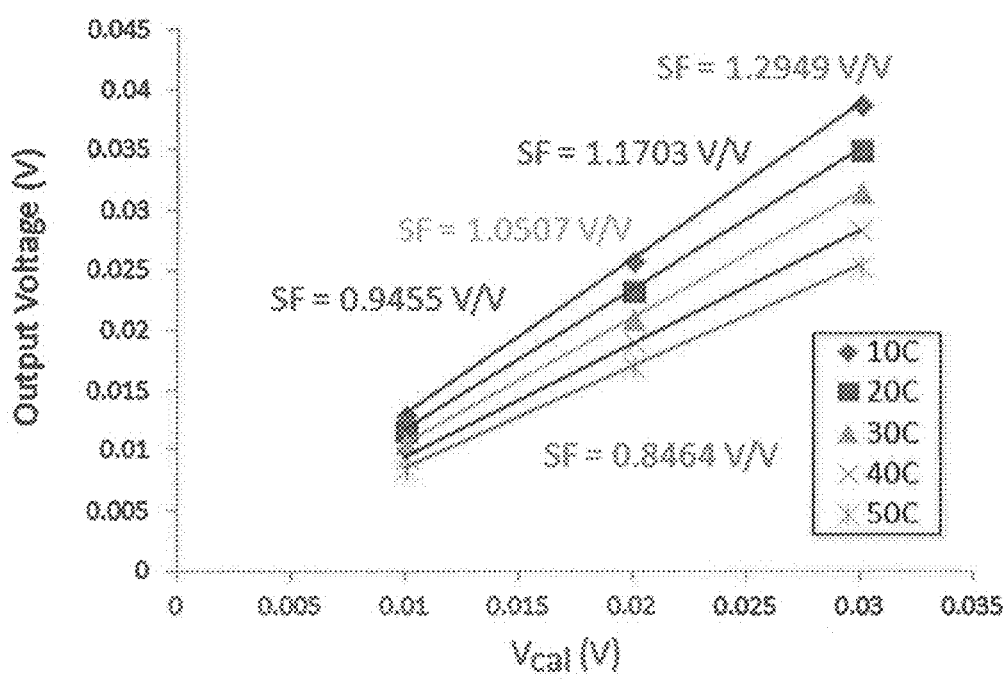
FIG. 10 is a graph illustrating the physical scale factor measured across a temperature range of 10-50° C. according to the present disclosure.
Figure 11:
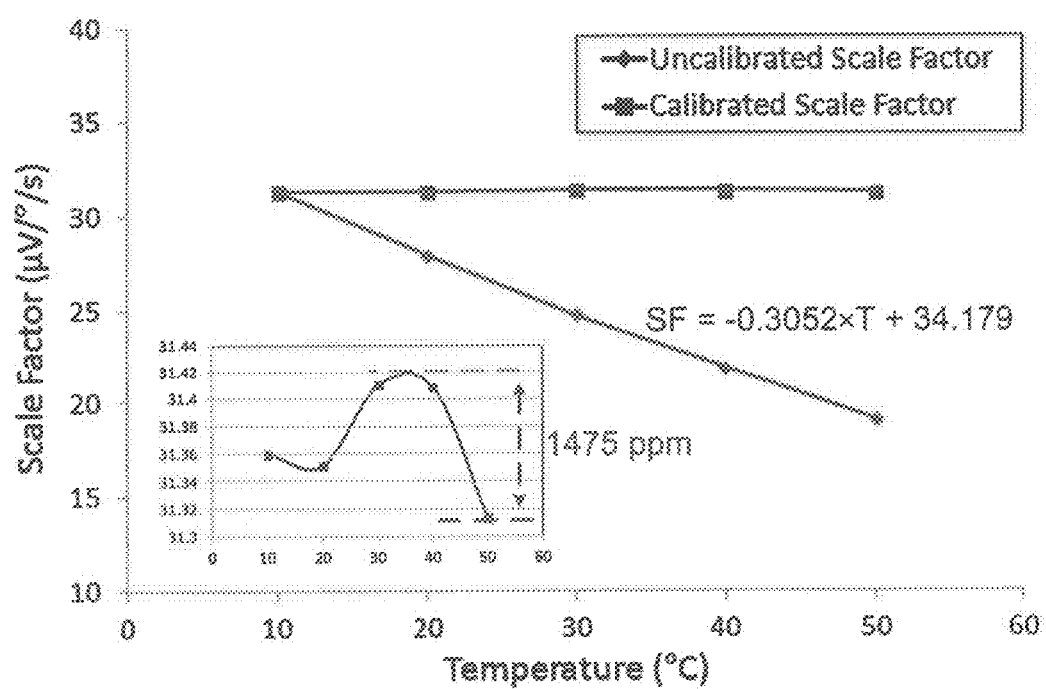
FIG. 11 is a graph illustrating the scale factor is calibrated with 45 according to the present disclosure.

In order to characterize the scale factor calibration, the circuit of FIG. 3 was implemented by adding analog multipliers to provide the calibration stimuli for the gyroscope. FIG. 10 show the measurement results of physical scale factor and calibration scale factor respectively, on the same setup at five different temperature points of 10-50° C. The calibrated scale factor value is calculated based on $$SF_{Phy,calibrated,n} = SF_{elec,1} \frac{SF_{Phy,n}}{SF_{elec,n}} \qquad (13)$$

in which $SF_{phy}$ represents physical scale factor measured from applying physical rotation, and $SF_{cal}$ represents calibration scale factor, in response to electrical virtual rotation. FIG. 11 shows the non-calibrated scale factor across the temperature range, in comparison to the calibrated scale factor The ~40% temperature drift of the un-calibrated scale factor is compensated by >250 times down to 1500 ppm temperature instability of scale factor.

Figure 12:
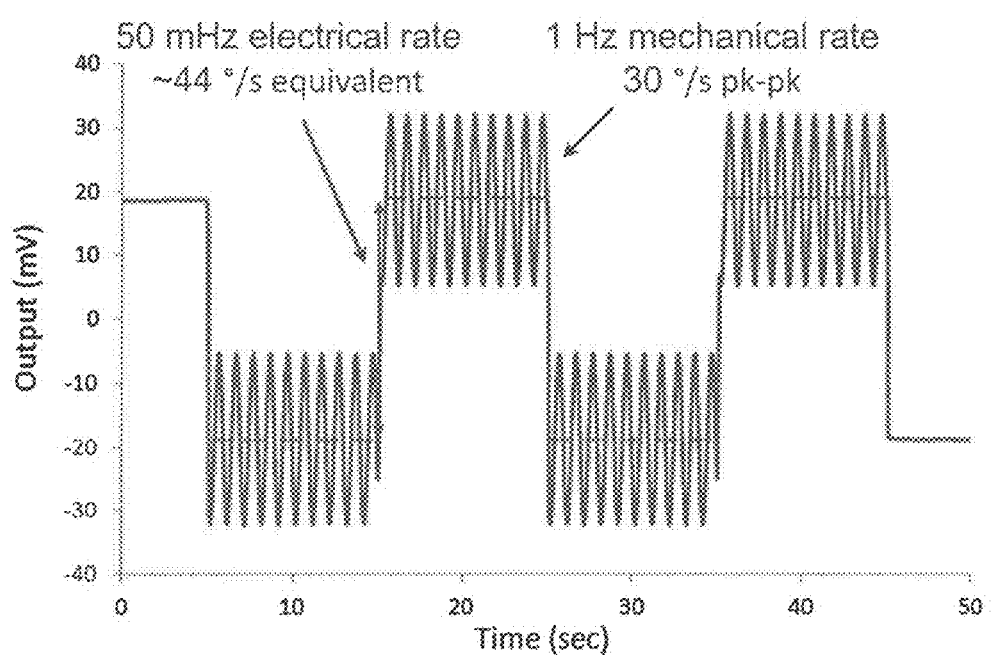
FIG. 12 is a graph illustrating the overall rate output is the superposition of both calibration rate and physical rate, verifying that the calibration stimulus does not affect the gyroscope transfer function significantly according to the present disclosure.

FIG. 12 shows the application of both mechanical and calibration rates to the gyroscope, verifying that the overall rate output is the superposition of the two rotation rates, implying that online scale factor calibration can be performed without changing the transfer function of the gyroscope.

Figure 5:
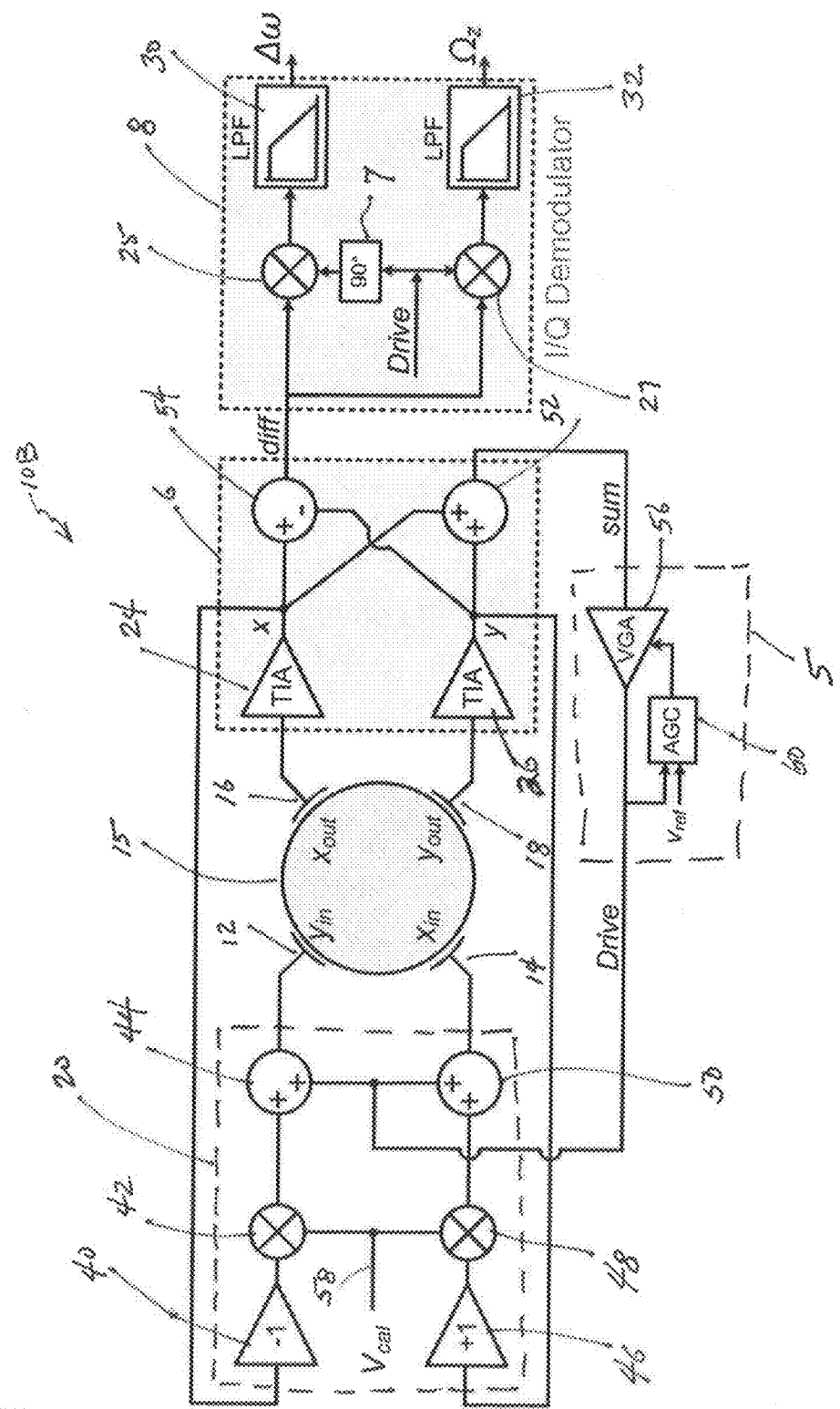
FIG. 5 is a graph illustrating that the scale factor calibration can improve the turn-on to turn-on stability of scale factor, according the present disclosure.

FIG. 5 illustrates that the scale factor calibration can improve the turn-on to turn-on stability of scale factor. Measured results show 150 times improvement of scale factor stability over 7 consecutive days, from 1% rms instability of scale factor in conventional single-mode scheme down to 60 ppm rms drift in dual-mode self-calibrated scheme.

The reader will appreciate that the foregoing discloses a dual-mode actuation and sensing scheme which actuates both modes of an axisymmetric gyroscope and senses both outputs. The proposed scheme uses the sum of the two outputs to provide self-sustaining closed-loop oscillation, and uses the difference of the two modes for extracting differential rate information while rejecting the common-mode bias terms of the gyroscope, hence provide inherent bias calibration. Moreover, the proposed scheme facilitates scale factor calibration of an axisymmetric gyroscope. The proposed scheme provides twice larger rate sensitivity than a conventional coherent demodulation scheme and achieves twice better SNR. Furthermore, the difference output of the dual-mode gyroscope scheme can provide a mode-split indicator signal which can be used during the gyroscope operation to automatically match the gyroscope modes.

The present disclosure is illustratively described above in reference to the disclosed embodiments. Various modifications and changes may be made to the disclosed embodiments by persons skilled in the art without departing from the scope of the present disclosure as defined in the appended claims.

What is claimed is:

1. A gyroscope apparatus having a plurality of resonance modes comprising:
   a resonator body;
   first and second drive electrodes coupled to the resonator body;
   first and second output electrodes coupled to the resonator body;
   interface circuitry for driving the first drive electrode and second drive electrode simultaneously with a primary calibration signal derived at least in part from output signals from the first and second output electrodes; and
   interface circuitry for generating calibration stimulus by multiplying the output signals of the first and second output electrodes with opposite polarities of a calibration signal, Vcal, and adding the multiplier outputs in a cross-coupled configuration to the drive signals of second and first drive electrodes to mimic mechanical rotation in an electrical domain, thereby tracking variations of mechanical rotation rate sensitivity.

2. The apparatus of claim 1 wherein the interface circuitry further comprises:
   interface circuitry for monitoring a quadrature-phase rate output from the first and second output electrodes and for measuring a split between natural frequencies of at least two of the gyroscope resonance modes.

3. The apparatus of claim 2 further comprising:
   first and second drive electrodes are capacitively coupled to the resonator body.

4. The apparatus of claim 1 wherein the interface circuitry further comprises:
   a proportional-integral-derivative (PID) controller for nulling a quadrature-phase rate output from the first and second output electrodes and for compensating for a frequency split between natural frequencies of at least two of the gyroscope resonance modes.

5. A method of calibrating a gyroscope having a plurality of resonance modes comprising:

A) providing a gyroscope configured for generating an output signal for each of two separate resonance modes;

B) actuating both resonance modes of the gyroscope simultaneously with calibration stimulus that is at least in part derived from the gyroscope outputs; and C) generating a primary calibration stimulus by multiplying output signals of two output electrodes with opposite polarities of a calibration signal, Vcal, and adding multiplier outputs to input signals of second and first drive electrodes in a cross-coupled configuration;

D) determining a split between natural frequencies of at least two of the gyroscope resonance modes; and E) compensating for the frequency split.

6. The method of claim 5 wherein the gyroscope comprises a resonator body having first and second drive electrodes coupled thereto and wherein B) comprises:

B1) simultaneously providing to the first and second drive electrodes a calibration stimuli that are at least in part generated from the output electrode signals.

7. The method of claim 5 wherein the gyroscope comprises a resonator body having first and second drive electrodes coupled thereto and wherein B) comprises:

B1) providing a first drive signal to the first drive electrode; and

B2) simultaneously providing a second drive signal to the second drive electrode;

the first and second drive signal have a common component and a differential component that is derived at least in part from the gyroscope outputs to mimic mechanical rotation rate.

8. The method of claim 5 wherein the gyroscope comprises a resonator body having first and second sense electrodes coupled thereto and wherein C) comprises:

C1) subtracting the output signal of the first sense electrode from the output signal of the second sense electrode to form a difference signal therefrom.

9. The method of claim 5, wherein the gyroscope comprises a resonator body having first and second sense electrodes coupled thereto and wherein C) comprises:

C1) summing the output signal of the first sense electrode with the output signal of the second sense electrode to form a sum signal therefrom.

10. A method of calibrating a gyroscope comprising:

A) providing a gyroscope comprising a resonator body having a plurality of electrodes coupled thereto, the gyroscope having a plurality of resonance modes; and B) actuating both modes simultaneously with a sum of actuation signals and calibration stimulus, C) generating a calibration signal by multiplying output signals of first and second output electrodes with opposite polarities of a calibration reference, Vcal, and adding multiplier outputs in a cross-coupled configuration to actuation signals coupled to second and first drive electrodes, to provide an electrical mimic of mechanical rotation;

D) determining a split between natural frequencies of at least two of the gyroscope resonance modes for calibration; and E) compensating for the frequency split with a PID controller.

11. The method of claim 10, wherein B) comprises:

B1) providing a first drive signal to a first drive electrode; and

B2) simultaneously providing a second drive signal to a second drive electrode, the first and second drive signals having a common actuation component and a differential calibration component that is derived at least in part from the gyroscope outputs to mimic mechanical rotation rate.

12. A gyroscope apparatus having a plurality of resonance modes comprising:

a resonator body;

a primary scale factor self-calibration mechanism that multiplies outputs of first and second output electrodes with opposite polarities of a calibration reference, Vcal, and adds the multiplier outputs to the actuation signals applied to the second and first drive electrodes, in a cross-coupled configuration to electrically mimic mechanical rotation that tracks the variations of the mechanical rotation rate sensitivity;

an auxiliary self-calibration mechanism for monitoring a quadrature-phase rate output from first and second output electrodes coupled to the resonator body and for measuring a split between natural frequencies of at least two of the gyroscope resonance modes; and a controller for nulling the quadrature-phase rate output and for compensating for the frequency split between natural frequencies of at least two of the gyroscope resonance modes.

13. The apparatus of claim 12 wherein the primary scale factor self-calibration mechanism comprises:

first and second drive electrodes coupled to the resonator body.

14. The apparatus of claim 13 wherein the primary scale factor self calibration mechanism further comprises:

interface circuitry for applying a rotating electrostatic field to the first drive electrode and second drive electrode simultaneously.

15. The apparatus of claim 13, wherein drive circuitry comprises:

interface circuitry for providing a first drive signal to the first drive electrode; and interface circuitry for simultaneously providing a second drive signal to the second drive electrode, the first and second drive electrodes having a common-mode actuation component and a differential calibration stimulus component that is at least in part derived from gyroscope output signals.

16. The apparatus of claim 15, wherein the first drive signal and second drive signal are at least partially derived from a calibration reference signal, Vcal.

17. The apparatus of claim 16, wherein the calibration reference signal is a low frequency signal selected from one of a direct current signal, sinusoidal signal, square-wave signal, or pulse-wave signal.

18. A calibration method for automatic mode-matching of a gyroscope having multiple resonance modes, comprising:

a) monitoring a quadrature-phase rate output from the gyroscope;

b) generating a primary calibration stimulus by multiplying output signals of two output electrodes of the gyroscope with opposite polarities of a calibration signal, Vcal, and adding multiplier outputs to input signals of second and first drive electrodes of the gyroscope in a cross-coupled configuration;

c) determining a split between natural frequencies of at least two of the multiple resonance modes of the gyroscope; and d) nulling the quadrature-phase rate output with a PID controller, thereby compensating for the natural frequency split.

* * * * *

UNITED STATES PATENT AND TRADEMARK OFFICE
CERTIFICATE OF CORRECTION

Page 1 of 1

PATENT NO. : 10,191,079 B2
APPLICATION NO. : 14/942530
DATED : January 29, 2019
INVENTOR(S) : Arashk Norouz Pour Shirazi and Farrokh Ayazi It is certified that error appears in the above-identified patent and that said Letters Patent is hereby corrected as shown below:

In the Specification

In Column 1, Lines 20-23:
"The subject matter disclosed herein was made partially with U.S. Government support from DARPA under contract W31P4Q-12-l-0004. The U.S. Government may have certain rights in the invention."

Should read:
-- This invention was made with government support under Contract No. W31P4Q-12-1-0004 awarded by the Department of Defense. The government has certain rights in the invention. --

Signed and Sealed this
Twenty-seventh Day of August, 2019

Andrei Iancu
*Director of the United States Patent and Trademark Office*